United States Patent [19]
Maruno et al.

[11] Patent Number: 5,802,505
[45] Date of Patent: *Sep. 1, 1998

[54] WAVEFORM SIGNAL EQUALIZING METHOD AND APPARATUS AND SIGNAL RECORDING AND REPRODUCING APPARATUS

[75] Inventors: Susumu Maruno, Osaka; Sigeo Sakaue, Moriguchi; Yasuharu Simeki, Suita; Taro Imagawa, Kadoma; Toshiyuki Kouda, Nara, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 577,347

[22] Filed: Dec. 22, 1995

Related U.S. Application Data

[62] Division of Ser. No. 221,905, Apr. 1, 1994, abandoned.

[30] Foreign Application Priority Data

Apr. 13, 1993 [JP] Japan ............................ 5-86153
Oct. 14, 1993 [JP] Japan ............................ 5-257120

[51] Int. Cl.$^6$ ............................ G05B 13/00; G06F 15/18
[52] U.S. Cl. ............................ 706/16; 360/1; 360/6
[58] Field of Search ............................ 395/22; 706/16; 360/1, 6

[56] References Cited

U.S. PATENT DOCUMENTS

| | | |
|---|---|---|
| 3,840,891 | 10/1974 | Hellwarth .................... 360/40 |
| 4,876,616 | 10/1989 | Katsumata et al. .................... 360/53 |
| 5,126,852 | 6/1992 | Nishino et al. .................... 358/335 |
| 5,231,544 | 7/1993 | Matsushige .................... 360/46 |
| 5,239,423 | 8/1993 | Sadowski .................... 360/46 |
| 5,272,723 | 12/1993 | Kimoto et al. .................... 375/11 |
| 5,319,738 | 6/1994 | Shima et al. .................... 395/24 |
| 5,347,499 | 9/1994 | Woo .................... 369/4 |
| 5,461,189 | 10/1995 | Higashi et al. .................... 84/601 |
| 5,467,428 | 11/1995 | Ulug .................... 395/23 |
| 5,515,450 | 5/1996 | Takeo et al. .................... 382/132 |
| 5,577,165 | 11/1996 | Takebayashi et al. .................... 395/2.84 |
| 5,644,446 | 7/1997 | Tsai et al. .................... 360/13 |
| 5,703,889 | 12/1997 | Shimoda et al. .................... 371/55 |

FOREIGN PATENT DOCUMENTS 3-118605  5/1991  Japan.

*Primary Examiner*—George B. Davis
*Attorney, Agent, or Firm*—Beveridge, DeGrandi, Weilacher & Young, LLP

[57] ABSTRACT

A learning type signal recording and reproducing apparatus has a signal detector for detecting signals recorded on recording media, a teaching signal generator for generating reference teaching signals having predetermined waveform signal patterns, and a learning type waveform converter for generating converting rules from signals recorded on the recording medium to original signals corresponding to the recorded signals, by learning the relationship between the detection results by the signal detector of teaching signals recorded on the recording media and reference teaching signals outputted by the teaching signal generator. With this apparatus, signals can be stably reproduced even if the signals contain distortion caused by noise or difference in the recording media.

16 Claims, 12 Drawing Sheets

Fig. 3
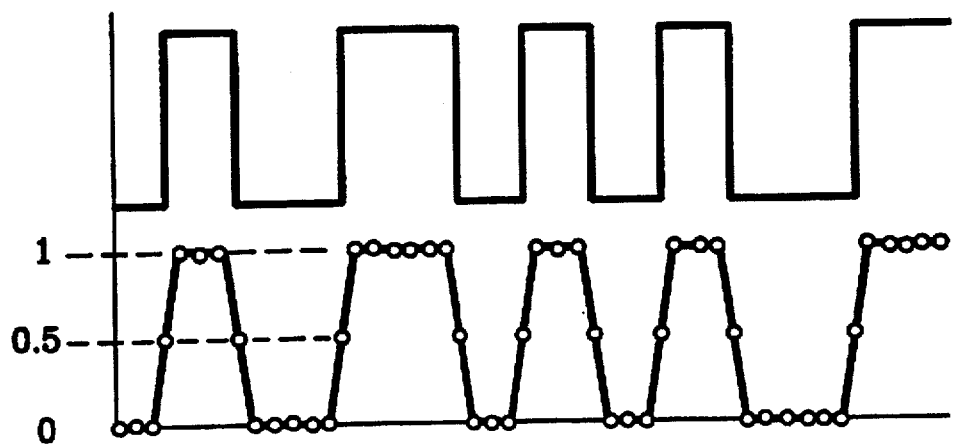
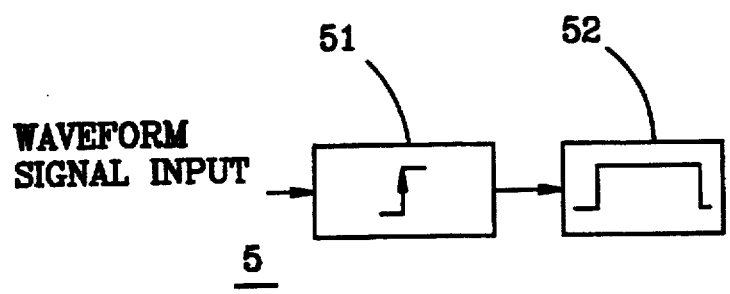
Fig. 4(a)
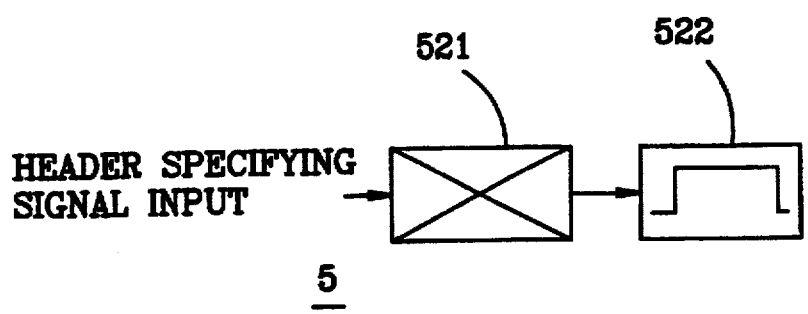
Fig. 4(b)

WAVEFORM SIGNAL EQUALIZING METHOD AND APPARATUS AND SIGNAL RECORDING AND REPRODUCING APPARATUS

This application is a divisional of application Ser. No. 08/221,905 filed Apr. 1, 1994, now abandoned.

DESCRIPTION OF THE INVENTION

1. Field of the Invention

The present invention relates to a waveform equalizing method and an apparatus for equalizing and shaping waveform signals containing distortion, and more particularly, to a signal recording and reproducing apparatus such as optical disks, magnetic disks, or magnetic tapes.

2. Related Art of the Invention

For conventional techniques to equalize and shape waveform signals containing distortion, an apparatus to equalize and shape signals using linear operation has already been proposed.

FIG. 11 shows the outline of a this type of conventional waveform signal equalizing apparatus, in which numerals 24, 25 are delay circuits, numerals 21, 22, 23 are coefficient resistors, which have coefficient values of $\alpha$, $\beta$, and $\gamma$, respectively. Numeral 26 is an operational amplifier.

FIG. 12 shows how the waveform signals entered in the waveform signal equalizing apparatus are equalized and shaped. That is, when waveform signals s(t) shown in waveform (a) of FIG. 12 are entered in the waveform signal equalizing apparatus, delay circuits 24, 25 delay input waveform signals by a specified time $\tau$, generating waveform signals $S(t-\tau)$, $s(t-2\tau)$ with different phases with respect to time. In addition, coefficient resistors 21, 22, 23 weight delay signals together with input waveform signals, and generate $\alpha \cdot s(t)$, $\beta \cdot s(t-\tau)$, and $\gamma \cdot (t-2\tau)$. Waveform (b) shows signal $\beta \cdot s(t-\tau)$ generated by delay circuit 24 and coefficient resistor 22. On the other hand, signals $\alpha \cdot s(t)$ and $\gamma \cdot s(t-2\tau)$ are synthesized to make waveform signals as shown in waveform (c), which is entered to the negative input terminal of the operational amplifier 26, and signal $\beta \cdot s(t-\tau)$ is entered to the positive input terminal of the operational amplifier 26, and equalizing output as shown waveform (d) is obtained from the operational amplifier 26. Binary-coding the signal shown in waveform (d) can at last produce shaping signals as shown in the graphic waveform (e).

However, in the conventional waveform equalizer as described above, only linear waveform equalization by coefficient resistors can be achieved and when signals containing distortion with extremely strong nonlinearity are entered, equalizing signals completely different form original waveform signals are outputted, making it difficult to obtain equalizing signals with less equalizing errors.

FIG. 13 shows how equalization and shaping take place when waveform signals containing distortion with extremely strong nonlinearity is entered into the waveform signal equalizing apparatus shown in FIG. 11.

In FIG. 13, waveform (o) is an original signal, waveform (a) is an input waveform signal s(t), which is the original signal (o) to which distortion with extremely strong nonlinearity is added. The waveform (b) is $\beta \cdot s(t-\tau)$, waveform (c) a synthesized signal of $\alpha \cdot s(t)$ and $\gamma \cdot s(t-2\tau)$, waveform (d) an equalizing signal outputted from the operational amplifier 26, waveform (e) a shaping signal which binary-codes waveform (d) and is finally obtained. As clear from FIG. 13, when signals (a) containing distortion with extremely strong nonlinearity are entered, even if the accent of waveform signal (e) is shaped by using the circuit shown in FIG. 11, only the shaped signal (e) completely different from the original waveform signal shown in waveform (o) is obtained, and it is difficult to obtain equalizing signals with less equalizing error.

On the other hand, conventionally, for techniques to reproduce recorded signals in optical disks, magnetic disks, magnetic tapes, etc., an apparatus has been proposed to threshold-process to either 0 or 1 the signals detected by optical pickups or magnetic heads with a predetermined value and output reproduced signals.

FIG. 16 shows one example of a block diagram of this type of conventional signal recording and reproducing apparatus. In FIG. 16, numeral 82 is a signal detector which detects signals recorded in media 81, numeral 84 is a threshold value memory which holds predetermined threshold values, numeral 83 is a comparator which compares the signal detected by the signal detector 82 with the threshold value held in the threshold value memory 84 and outputs, for example, either 0 or 1 in accordance with the comparison results.

The signal detector 82 detects a series of waveform signals subject to threshold-processing from the recording media 81 and inputs them in the comparator 83. The comparator 83 compares the input signals with the value of threshold memory 84, and outputs "1" if the signal is larger than the threshold value and "0" if it is smaller than the threshold value to stably reproduce signals even if there is distortion of signals caused by noise, etc.

However, in the conventional signal recording and reproducing apparatus as described above, there is a problem to output erroneous reproduced signals when greatly wobbling signals are detected by the signal detector 82, for example, as shown in FIG. 17 due to noise, difference of recording media, or signal detecting conditions, etc.

SUMMARY OF THE INVENTION

It is an object of the present invention to provide a waveform equalizing method and apparatus for successfully equalizing and shaping even input waveform signals containing strong distortion with nonlinearity and minimizing equalizing errors with these problems of conventional waveform signal equalizers taken into account.

Another object of the present invention is to provide a learning type recording and reproducing apparatus which can correctly process threshold values and can stably reproduce signals with the problems of conventional signal recording and reproducing apparatus taken into account.

A waveform equalizing method of the present invention comprises steps of obtaining a relationship between a waveform signal obtained via a specified signal system into which a predetermined reference teaching signal is input and the predetermined reference teaching signal, and based on the relationship, obtaining an original waveform signal by using serial signals at each point on a transition axis of waveform signals which are output from the specified signal system into which the original signal is input, by utilizing a pattern recognition method, and thereby generating the original waveform signal.

A waveform signal equalizing apparatus of the present invention comprises serial signal sampling means for sampling signals at each point on a transition axis of waveform signal which is output from a specified signal system into which original waveform signal is input, waveform signal recognition means for obtaining the original waveform signal corresponding to the signals sampled at each point on the transition axis by the serial signal sampling means, on a basis of the sampled signals, by a use of a pattern recognition method, and means for equalizing signal generating means for generating equalizing signals for the waveform signal output from the specified signal system, based on results of the waveform signal recognition means.

A learning type signal recording and reproducing apparatus of the present invention comprises:

a reference signal generating means for generating predetermined reference waveform signals, a signal detection means for detecting reference signals from a recording media on which the reference waveform signals are recorded, and a conversion rule generating means for generating conversion rules to correctly reproduce signals recorded on the recording media, based on the detected reference signals and the reference waveform signals generated by the reference signal generating means.

DESCRIPTION OF THE DRAWINGS

FIG. 3 is an example of reference teaching signal generated by the standard teaching signal generator in the waveform signal equalizer of the embodiment of FIG. 1.

FIG. 4 (a) is one example of the header sampling section of the embodiment of FIG. 1.

FIG. 4 (b) is an example of another header sampling section.

FIG. 14 (b) is the form of recording signals when signals are recorded by the learning type signal recording and reproducing apparatus of the the embodiment.

PREFERRED EMBODIMENTS

Preferred embodiments of the present invention will now be explained in detail with reference to the accompanying drawings.

Figure 1:
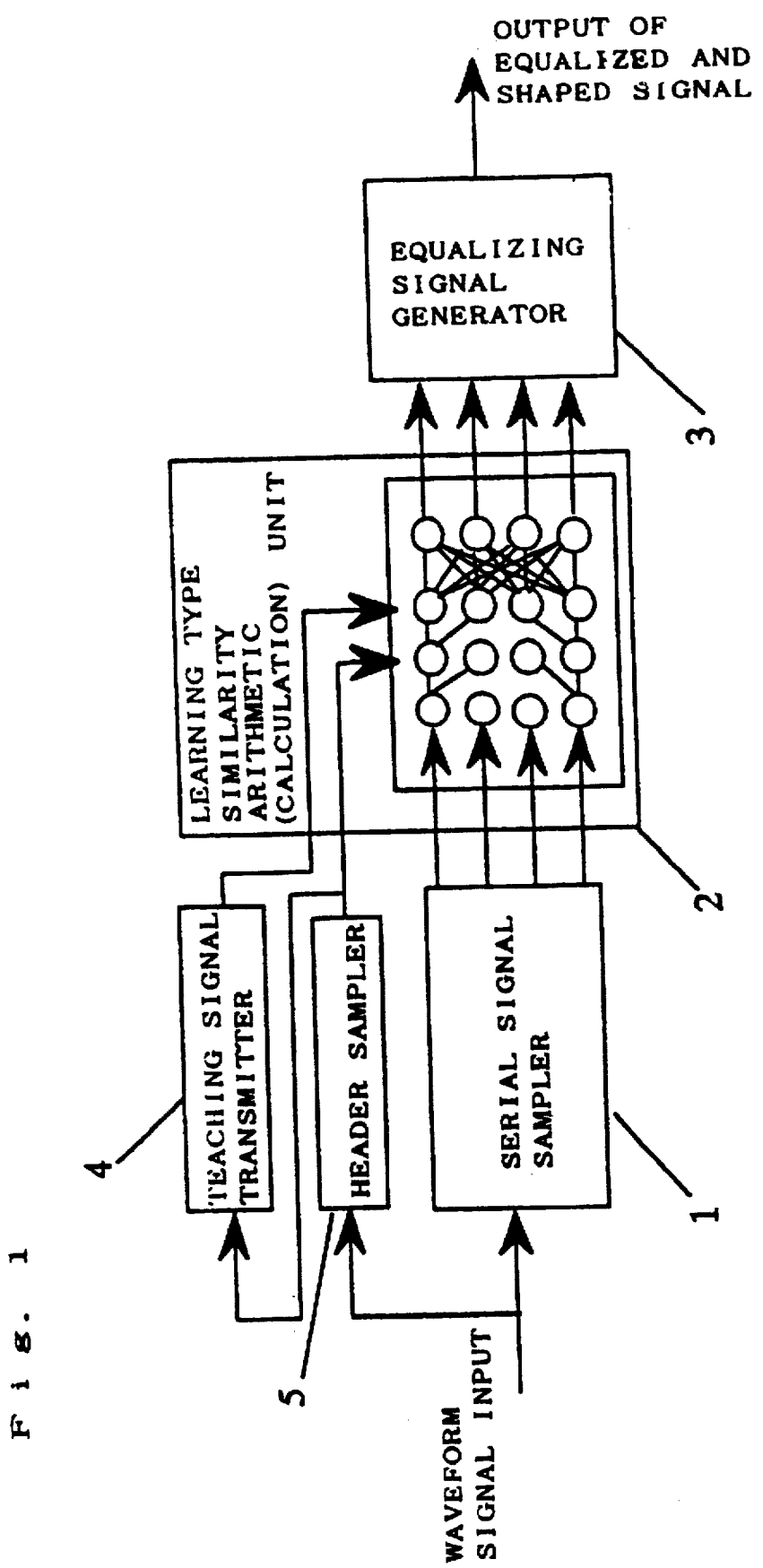
FIG. 1 is a block diagram of one embodiment of waveform signal equalizer according to the present invention.

FIG. 1 shows one embodiment of the present invention, which is a waveform signal equalizing apparatus when the same reference signals are promised (protocol) between the transmitting and receiving sides in a digital communication system. In FIG. 1, numeral 1 is a serial signal sampler, which samples a signal change at each point on the transition axis of the input waveform signals as serial signals. Numeral 4 is a teaching signal generator for generating waveform signals free from distortion based on the predetermined protocol, which permits the learning type similarity arithmetic unit 2 (later discussed) to learn the relationship between the signal at each point on the transition axis of the reference teaching signal based on the predetermined protocol in the sampled header by the header sampler 5 and the signal at each point on the transition axis of the reference teaching signal generated by the reference teaching signal generator 4. Numeral 2 is a learning type similarity arithmetic unit which composes a waveform signal recognition means and processes signal values of the waveform signal as multiple recognition categories, learns the relationship between the signals in the header sampled by the header sampler 5 and serial signals at each transition axis sampled by the serial signal sampler 1, as well as signal values as a recognition category; based on the results of this learning, similarity to the signal value as recognition category of serial signals at each point on the transition axis of the input waveform signals is outputted. Numeral 3 is an equalizing signal generator which outputs equalized and shaped signals in accordance with the similarity to each signal value which is outputted one by one from the learning type similarity arithmetic unit 2.

Now discussion will be made of the operation of the waveform signal equalizing apparatus of the above embodiment.

First of all, the header sampler 5 samples the header comprising signals formed based on a predetermined protocol, and the learning type similarity arithmetic unit 2 learns the relationship between the sampled header signal and the reference teaching signal generated by the reference teaching signal generator 4. Based on these learning results, the learning type similarity arithmetic unit 2 recognizes the input signals after the header and outputs the similarity to the signal values as recognition category. The equalizing signal generator 3 outputs equalized and shaped signals based on the similarity to each signal value outputted one by one from the learning type similarity arithmetic unit 2.

Figure 2:
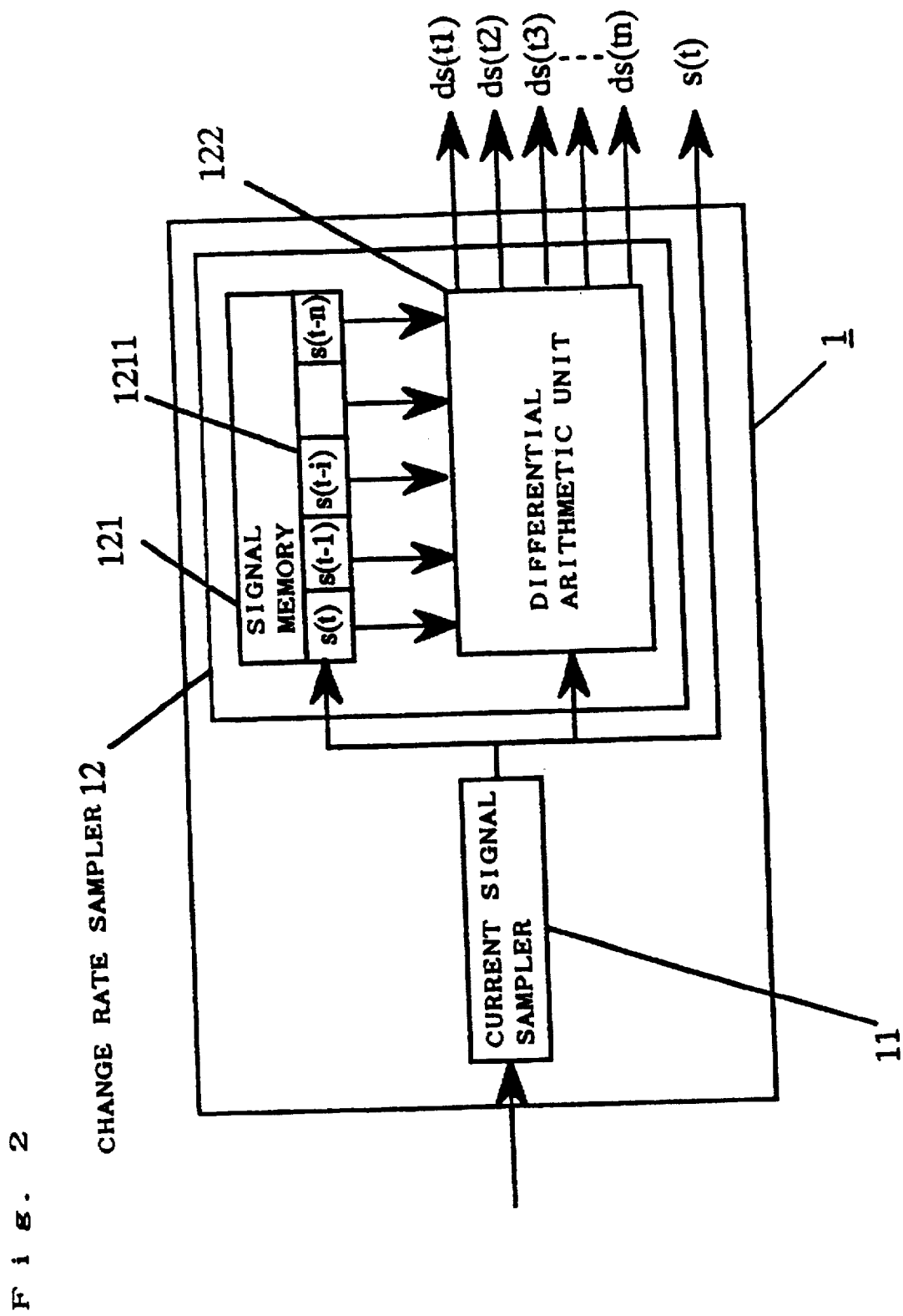
FIG. 2 is a block diagram of one example of serial signal sampling section in the waveform signal equalizer of the embodiment of FIG. 1.

FIG. 2 shows a detailed configuration of the serial signal sampler 1 in the waveform signal equalizer of the above embodiment. In FIG. 2, numeral 11 is a current signal sampler which samples the signal value of the entered waveform signal. Numeral 12 is a change rate sampler, which comprises a signal memory 121 and differential arithmetic unit 122. The signal memory 121 comprises n+1 signal memory units 1211 which store in memory the height of the sampled signals one by one. That is, when signals sampled by the current signal sampler 11 are entered one by one, the memory memorizes the sampled signals successively while shifting the memory position in the same manner as a shift register. Consequently, when the sampled signal s(t) at time t is entered, the condition in which the maximum n+1 signals from s(t) to s(t−n) are stored in memory is achieved. The differential arithmetic unit 122 calculates the difference ds(ti) between the signals(t) entered from the current signal sampler 11 and signal s(t−i) (i≠t) stored in the signal memory 121 as shown in Eq. 1 and outputs the differential values ds(t1) to ds(tn) which are a maximum n−1 pieces.

$$ds(ti)=d(t)-d(t-i)$$ (Eq. 1)

In this way, the serial signal sampler 1 outputs differential values from ds(t1) to ds(tn) found by the current input signal s(t) and differential arithmetic unit 122 to the learning type similarity arithmetic unit 2.

FIG. 3 shows an example of a reference teaching signal generated by the reference teaching signal generator 4 in the above embodiment. It generates the signal series comprising three values of 0, 0.5, 1 as shown in the lower row of FIG. 3 based on the protocol comprising a combination of ON/OFF (1 or 0) as shown in the upper column of FIG. 3.

FIG. 4 (a) shows one example of the header sampler 5 in the above embodiment, in which numeral 51 is a waveform input detector and detects the head end edge of the input waveform when waveform signals are entered. Numeral 52 is a gate pulse generator which generates gate pulses for a specified period using the waveform input detection signal of the waveform input detector 51 as a trigger and switches the learning type similarity arithmetic unit 2 to the learning mode or causes the reference teaching signal generator 4 to generate reference teaching signals.

FIG. 4 (b) shows another example of the header sampler 5. In FIG. 4 (b), numeral 521 is a header specifying signal detector, which detects the edge of the input signal when header specifying signals are entered from outside. Numeral 522 is a gate pulse generator, which generates gate pulses for a specified period using the waveform input detection signal of the waveform input detector 521 as a trigger and switches the learning type similarity arithmetic unit 2 to the learning mode or causes the reference teaching signal generator 4 to generate reference teaching signals.

Figure 5:
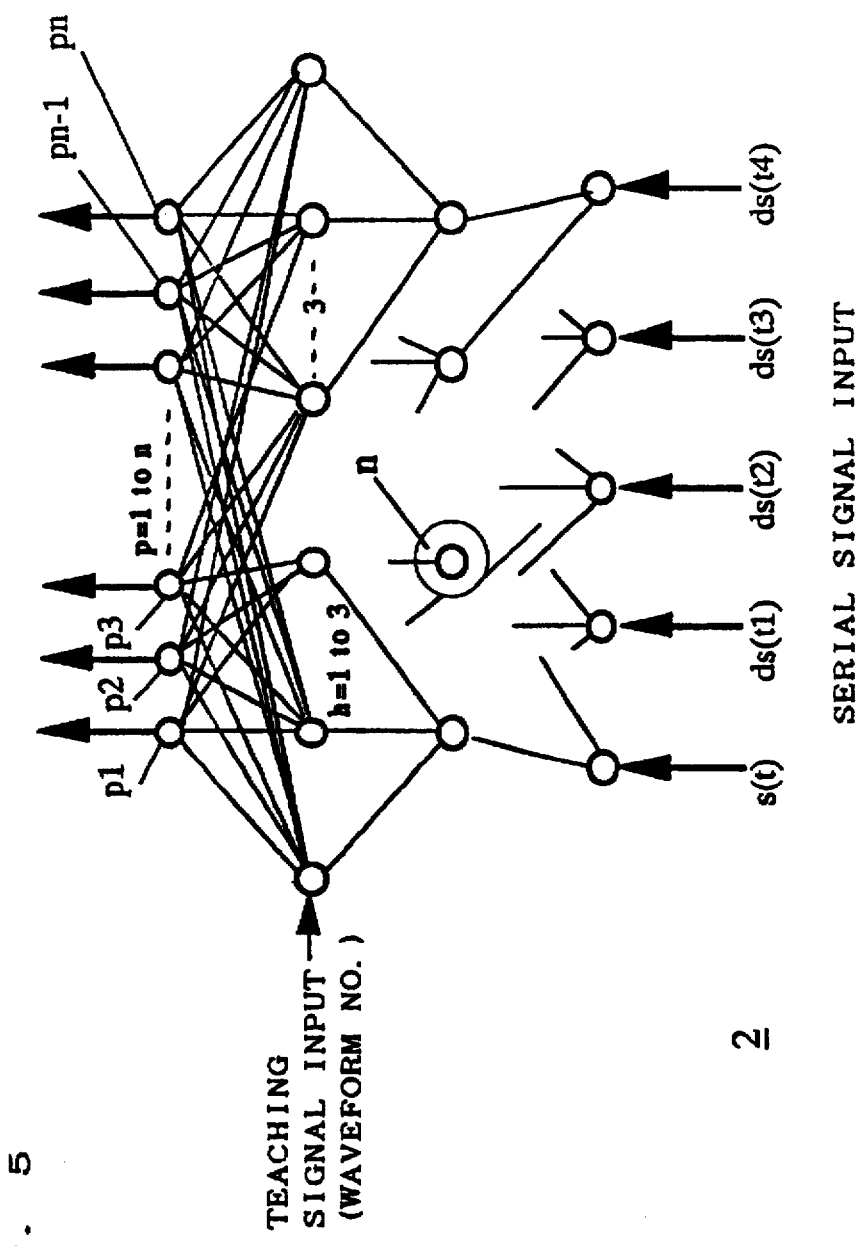
FIG. 5 is a configuration chart of an example of teaching type similarity operation section in the embodiment of FIG. 1.

FIG. 5 shows an example of a learning type similarity arithmetic unit 2 in the above embodiment. In FIG. 5, the learning type similarity arithmetic unit 2 judges serial signals s(t) and ds(t1) to ds(tn) sampled by the serial signal, thereby enabling recognition of a local waveform signal at time t, and a network is formed so that a plurality of unit recognition units n are combined to have a four-layer hierarchy. At the fourth layer, n pieces of unit recognition unit p1 to pn are provided, enabling learning recognition of n pieces of signal values corresponding to p1 to pn. The fourth-layer unit recognition units p1 to pn are interconnected with each output terminal of the third layer. The first layer is an input layer comprising five input terminals, from which five serial signals comprising s(t), ds(t1) to ds(t4) are entered.

Figure 6:
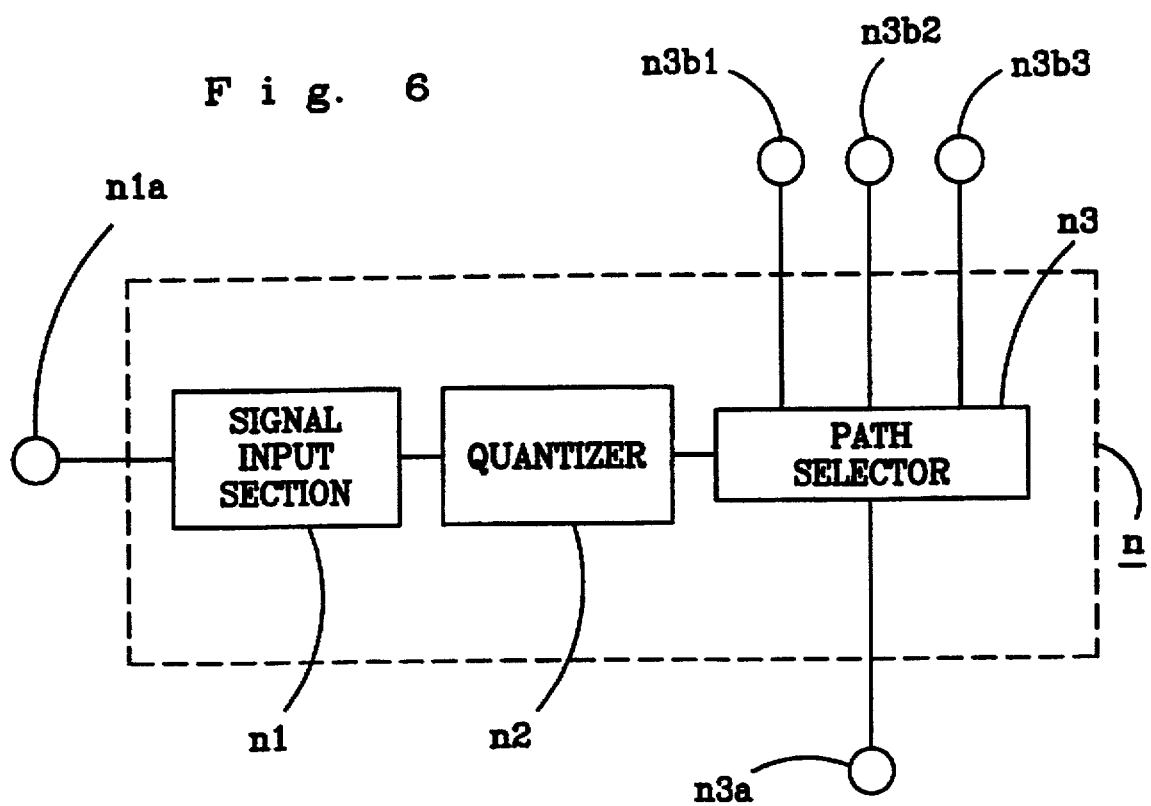
FIG. 6 is the first configuration example of a unit recognition unit used for the teaching type similarity arithmetic unit in the embodiment of FIG. 1.

FIG. 6 shows a configuration example of the unit recognition unit used for the second layer of the above-mentioned learning type similarity arithmetic unit 2. In FIG. 6, n1 is a signal input section, which enters serial signals entered via signal input terminal n1a to the quantizer n2. The quantizer n2 quantizes the entered serial signals and enters quantized values to the path selector n3. Numeral n3a is the path input terminal, n3b1, n3b2, n3b3 are path output terminals, which are interconnected when a network is formed with unit recognition units combined. The path selector n3 is designed to vary the connection method with path input selector n3a and path output terminals n3b1, n3b2, n3b3.

Figure 7:
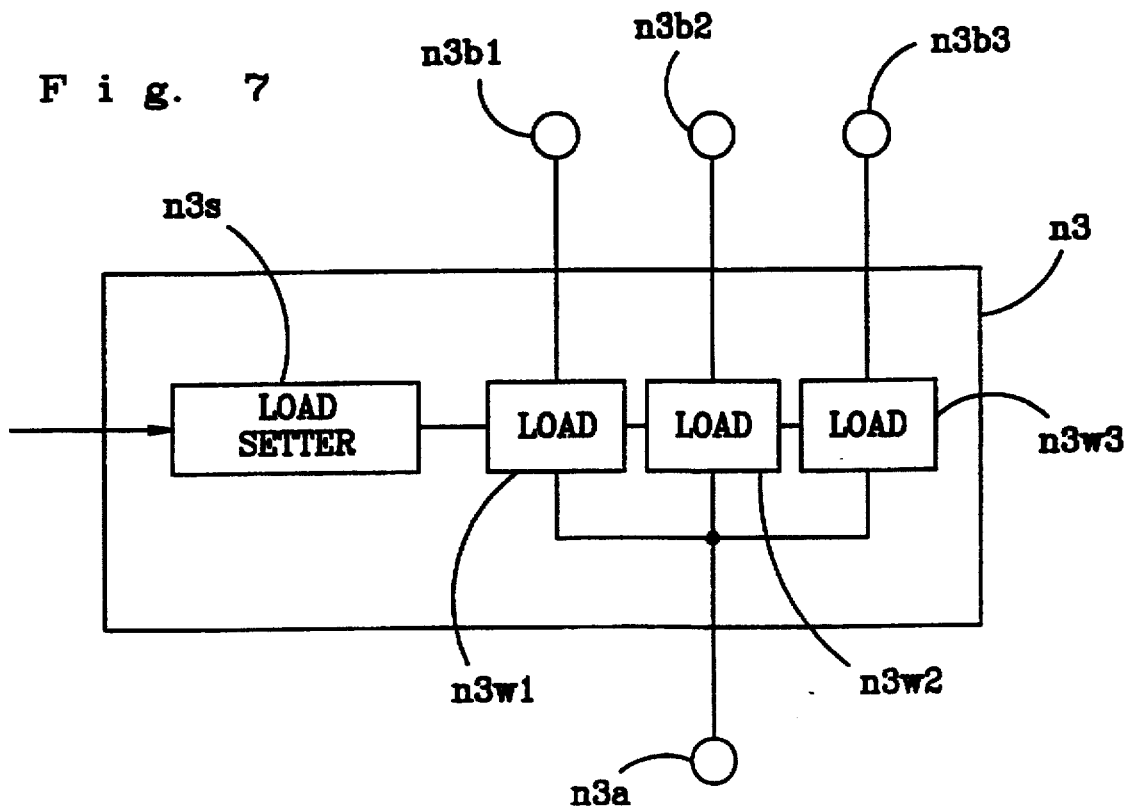
FIG. 7 is a detailed configuration of the path selecting section in the unit recognition unit of FIG. 6 in the embodiment of FIG. 1.

FIG. 7 shows a detailed configuration of the path selector n3 in the unit recognition unit n of FIG. 6 above. In FIG. 7, the path selector n3 comprises one path input terminal n3a, three path output terminals n3b1, n3b2, n3b3, load setter n3s, and loads n3w1, n3w2, n3w3. Loads n3w1, n3w2, and n3w3 are weights to multiply by signals entered from the path input terminal n3a, and multiplication results are outputted from path output terminals n3b1, n3b2 and n3b3. The load setter n3s sets loads n3w1 through n3w3 so that the strength of connections between path output and path input terminals indicated by the output reading of the quantizer n2 become the maximum.

Figure 8:
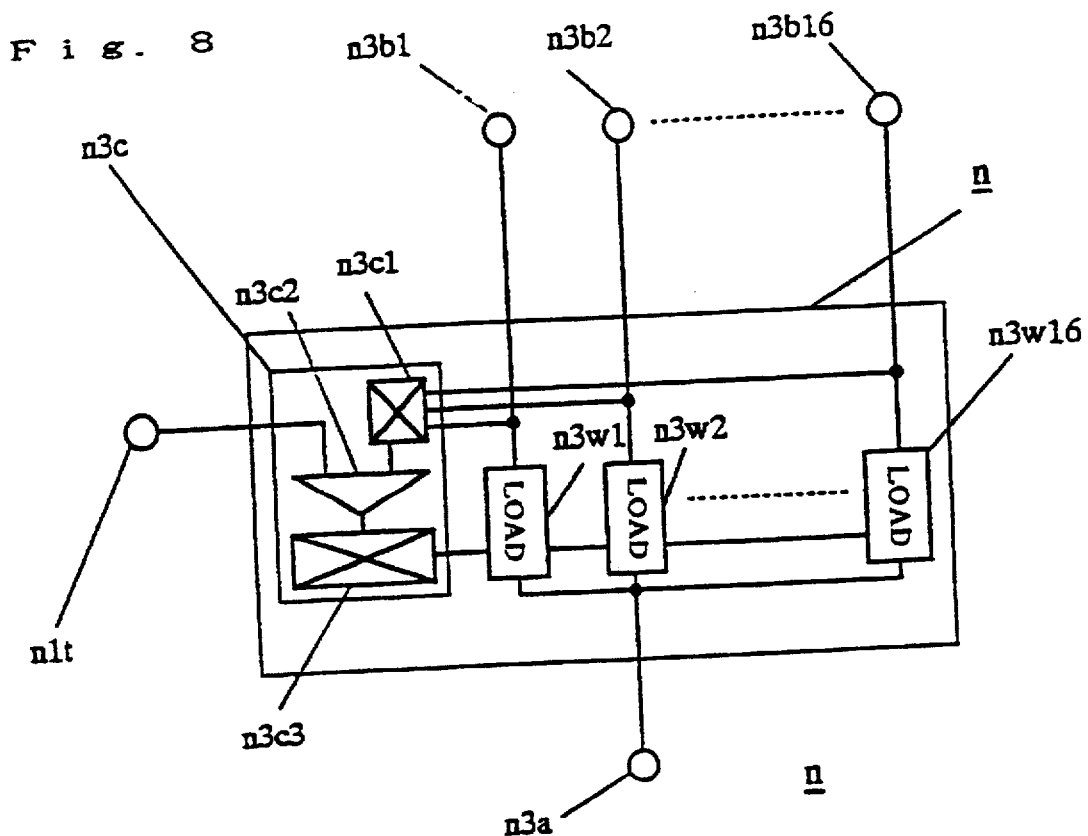
FIG. 8 is the second configuration example of a unit recognition unit used for learning type similarity arithmetic unit in the embodiment of FIG. 1.
Figure 11:
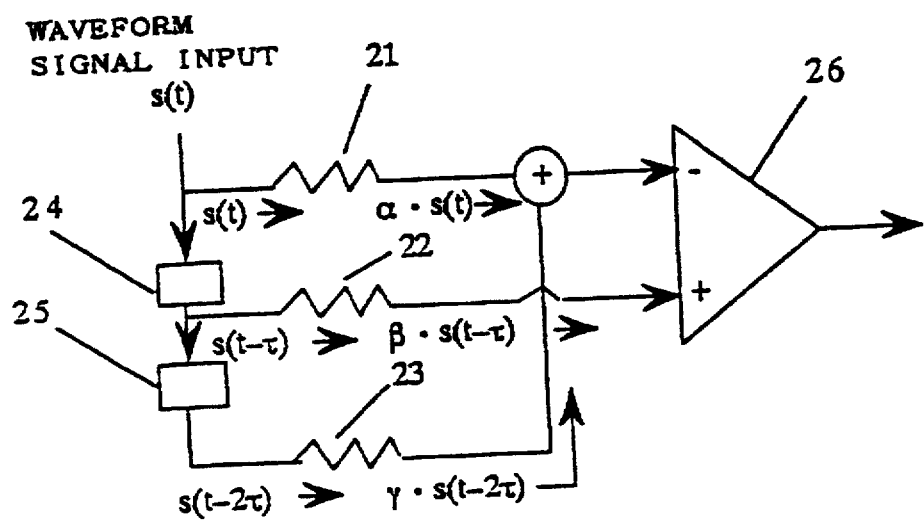
FIG. 11 shows a configuration of conventional equalizing signal generator in the embodiment of FIG. 1.

FIG. 8 is a configuration example of the unit recognizing unit used for the third layer of the learning type similarity arithmetic unit 2 in the above embodiment. In FIG. 8, designation n1t is a reference teaching signal input terminal, from which the number of a waveform value to be learned in the learning process, that is, the fourth-layer unit recognition unit number, is entered. Designation n3a is the path input terminal, n3b1 through n3b16 are path output terminals, and loads n3w1 through n3w16 are weights to multiply by the signals entered from the path input terminal n3a, and the multiplication results are outputted to path output terminals n3b1 through n3b16 of the path output section. Designation n3c is a path learning device which varies strength of connections between the path output terminal and path input terminal indicated by the teaching input value. In the recognition process, to the teaching signal input terminal n1t, signals are not entered and loads n3w1 through n3w16 hold the load condition after learning, weights path signals entered from the path input terminal, and output to path output terminals n3b1 through n3b16. The path learning device n3c comprises a maximum output terminal detector n3c1, a comparator n3c2 which compares the path output terminal number detected by the maximum output terminal detector n3c1 to the number of the path input terminal indicated by the teaching input. The comparator n3c2 compares the number of the path output terminal detected by the maximum output terminal detector n3c1 with the number of the path output terminal indicated by the teaching input value, and is designed to output 0 if both terminal numbers do not agree, and 1 if they agree, and the load increasing device n3c3 is designed to increase the strength between the path input terminal of the path input section and the path output terminal indicated by the output value of quantizer if the output of comparator n3c2 is 0.

Figure 9:
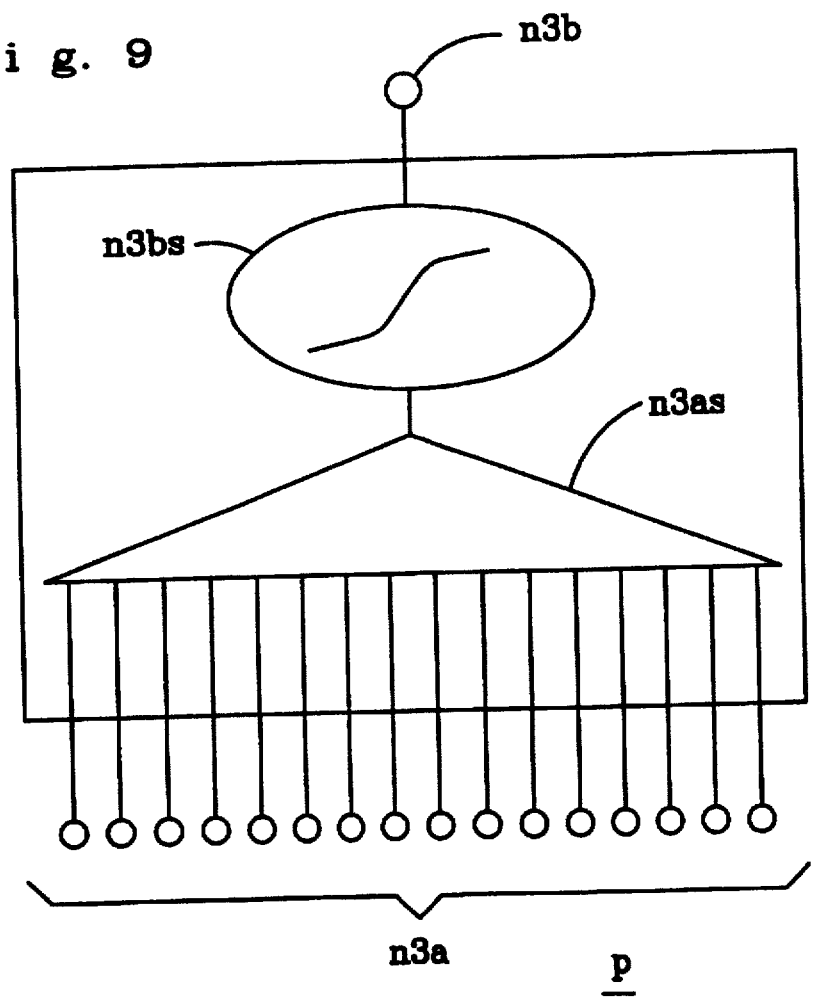
FIG. 9 is the third configuration example of a unit recognition unit used for learning type similarity arithmetic unit in the embodiment of FIG. 1.

The fourth layer is the output layer, to which multiple unit recognition units p1 through pn labeled to multiple signal values s(x) (x=1 to n) of waveform signal (for example, three unit recognition units p1 to p3 labeled to 0, 0.5, 1) and unit recognition units p1 to pn output similarity r(x) with respect to labeled signal values s(x) at each point on the transition axis of the entered waveform signals. Unit recognition units p1 to pn uses, for example, the unit recognition unit as shown in FIG. 9 and comprises an adder n3as, which adds input signals from multiple path input terminals n3a and a threshold processor n3bs which threshold-processes output signals of the adder n3as and outputs the results to the output terminal n3b. For the function to threshold-process, for example, a sigmoid function, a step function, etc. may be used.

Now, referring to the accompanying drawings, the learning operation of the learning type similarity arithmetic unit 2 shown in FIG. 5 will be explained in detail.

At first, entering waveform signals to the waveform equalizing apparatus causes the header sampler 5 to sample the header comprising signals transmitted in accordance with the predetermined protocol, switches the learning type similarity arithmetic unit 2 to the learning mode, and allows the reference teaching signal generator 4 to generate reference teaching signals. In this event, first of all, 1 is given as a path signal to the path input terminal n3a of the second unit recognition unit n of the learning type similarity arithmetic unit 4. When five serial signals comprising $s(t)$ and $ds(t1)$ through $ds(t4)$ sampled by the serial signal sampler 1 from the reference teaching signals based on the predetermined protocol are entered to five first-layer input terminals, these serial signals to signal input terminal n1a are entered to the quantizer n2 of the second-layer unit recognition unit n. The quantizer n2 of the second-layer unit recognition unit n quantizes serial signals and based on the quantized values, sets loads n3w1 through n3w3 to connect the upper-layer unit recognition unit and transmits the path output signal to the third layer unit recognition unit. In this event, loads n3w1 through n3w16 of the third-layer unit recognition unit weight path signals entered from the path input terminal n3a and outputs the weighted path signals to path output terminals n3b1 through n3b16. Then, the maximum output terminal detector n3c1 detects the path output terminal which maximizes the output and enters the number of the detected path output terminal to the comparator n3c2. To the teaching input terminal n1t, reference teaching signal value generated by the reference teaching signal generator 4, that is, a signal to identify to which of p1 through pn the said reference teaching signal corresponds is entered. The comparator n3cn compares the path output terminal number detected by the maximum output terminal detector n3c1 with the number of path output terminal indicated by the reference teaching signal value, and enters 0 when both terminal numbers do not agree, and 1 when they agree, to the load increasing device n3c3. In this event, when the output of the comparator n3c2 is 0, that is, when the path output terminal providing the maximum output differs from that indicated by the reference teaching signal value, the load increasing device n3c3 increases the strength of connections between the path input terminal of the path input section and the path output terminal of the path output section which the reference teaching signal value indicates.

As described above, the learning process of the learning type similarity arithmetic unit 2 of the waveform signal equalizer according to the present invention only requires the serial signals sampled by the serial signal sampler 1 from the reference teaching signal based on the predetermined protocol to be entered to the signal input terminal of each second-layer unit recognition unit via the first-layer input terminal and the method to connect with the upper-layer unit recognition unit to be set in accordance with the output of the quantizer n2 of each unit recognition unit, and in the third layer, requires to vary the strength of connections between the path input terminal of unit recognition unit with the path output terminal indicated by the reference teaching signal value generated by the reference teaching signal generator 4, thereby enabling extremely fast learning.

Now, discussion will be made on the waveform recognition operation in the learning type similarity arithmetic unit 2 which has finished learning operation as described above.

When input signals after the header are entered into the learning type similarity arithmetic unit 2, first of all, 1 is given as a path signal to the path input terminal n3a of the second-layer unit recognition unit in the completely same manner as that of the learning operation. Then, five serial signals comprising $s(t)$ and $ds(t1)$ through $ds(t4)$ sampled by the serial signal sampler 1 are entered to the signal input terminal n1a to the quantizer n2 of second-layer unit recognition unit via the first-layer five terminals. The quantizer n2 of the second-layer unit recognition unit quantizes the serial signals entered, respectively, and based on the quantized values, sets loads n3w1 through n3w3 for connection with the upper-layer unit recognition units, and enters path signals to the path signal input terminal n3a of the third-layer unit recognition unit. In the case of waveform recognition operation, to the teaching input terminal n1t of the third-layer unit recognition unit, no reference teaching signal value is entered. Consequently, loads n3w1 through n3w16 of the third-layer unit recognition unit hold the load condition at the time of learning, weight and output the path signals entered from the path input terminal n3a, and transmit the path signals to the path input terminal n3a of the fourth-layer unit recognition unit. The adder n3as of the path input section of the fourth-layer unit adds all path signals entered and transmits the results to the threshold processor n3bs. The threshold processor n3bs threshold-processes and outputs the signal to the output terminal n3b. Consequently, if the value of the added signal is greater than a certain threshold value, output takes place, and each unit recognition processor unit p1 through p3 outputs the similarity which indicates how such the entered serial signals agree to the signal value of waveform signal corresponding to the relevant units.

As described above, the waveform recognition process of the learning type similarity arithmetic unit 2 of the waveform signal equalizer according to the present invention can obtain recognition results of the entered serial signals by only entering the serial signals sampled by the serial signal sampler 1 to the signal input terminal of each unit recognition unit on the second layer via the first-layer input terminal, setting the connection method with the upper-layer unit recognition unit in accordance with the output of the quantizer of each unit recognition unit, weighing, in the third layer path, signals entered from the path input terminal n3a based on the load set at the learning process, outputting the weighted path signal to path output terminals n3b1 to n3bn, and transmitting the path signal to the path input terminal n3a of the all unit recognition unit on the fourth layer, thereby enabling extremely high-speed and accurate waveform recognition processing.

Figure 10:
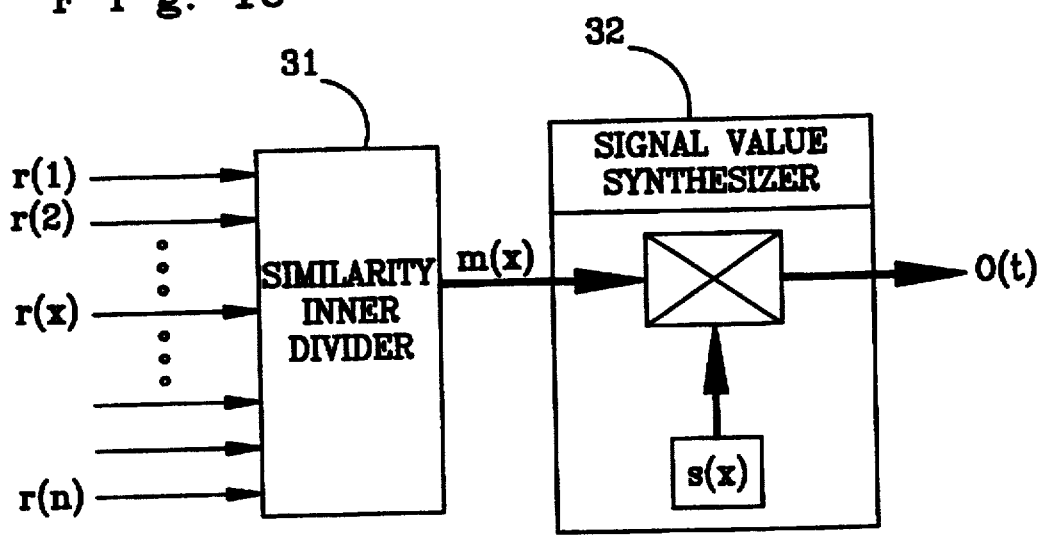
FIG. 10 is a configuration example of the equalizing signal generator in the embodiment of FIG. 1.
Figure 12:
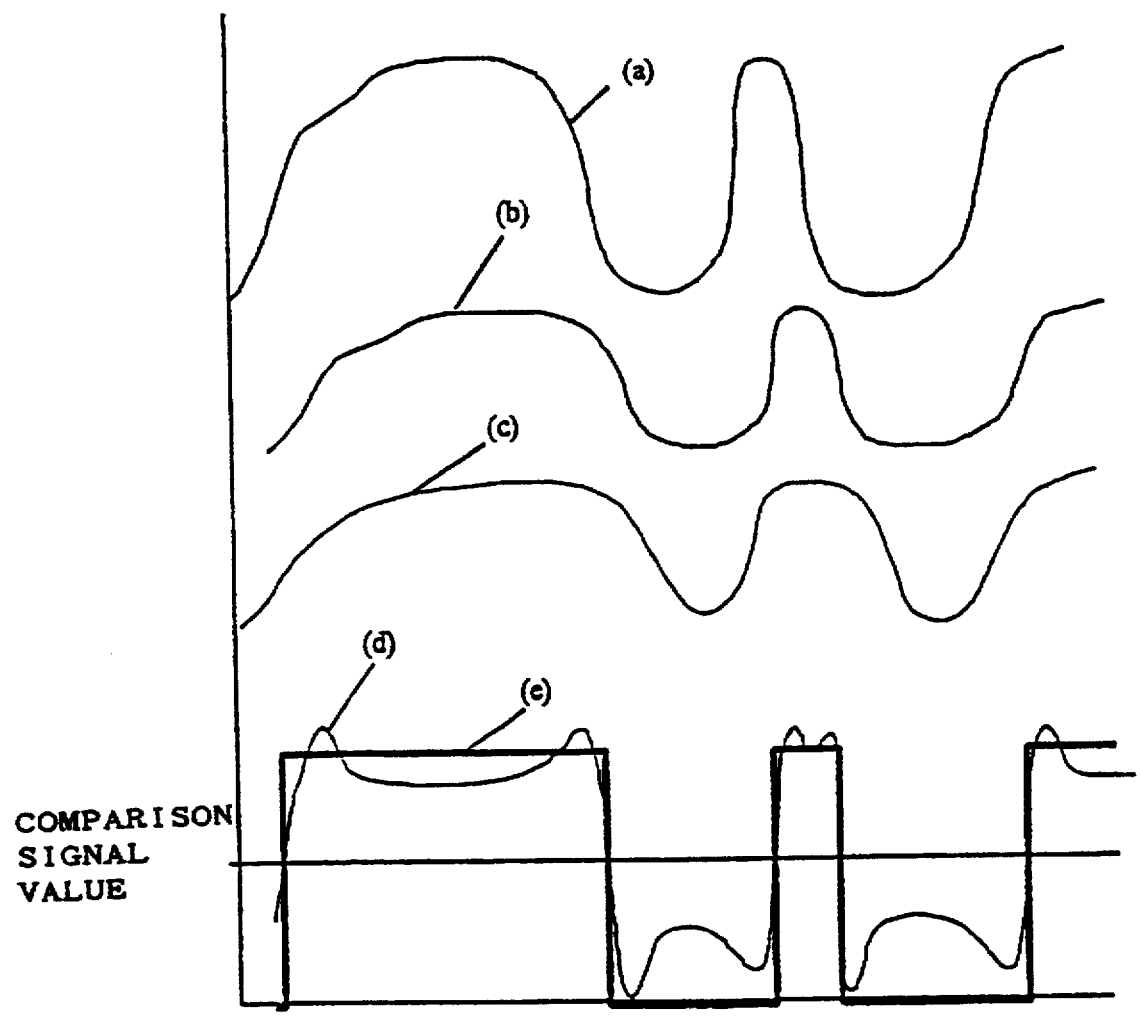
FIG. 12 shows how the waveform signals entered in the waveform signal equalizing apparatus are equalized and shaped.
Figure 13:
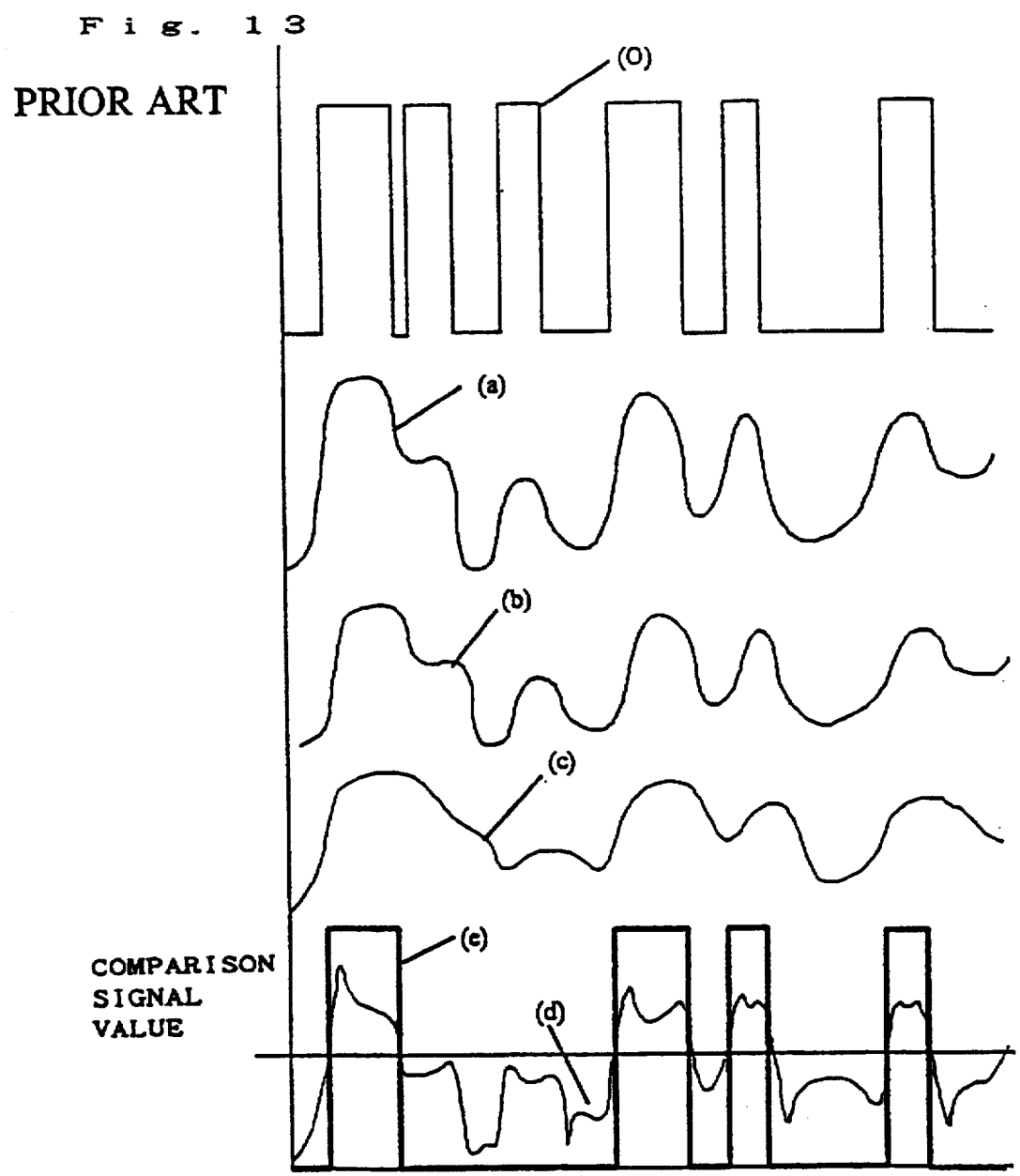
FIG. 13 is an example of signal waveform when signals with large distortion are equalized and shaped by a conventional waveform signal equalizer.

FIG. 10 is a configuration example of the equalizing signal generator 3 of the above embodiment. In FIG. 10, numeral 31 is a similarity inner divider, which calculates the inner division ratio $m(x)$ of a plurality of similarity $r(x)$ outputted by the unit recognition unit px (x=1 to n) of the waveform signal recognition section at time t as shown in Eq. 2 and output to the signal value synthesizer 32. The signal value synthesizer 32 calculates the sum of products $0(t)$ of the inner division ratio $m(x)$ and each labeled signal value $s(x)$ as shown in Eq. 2 and outputs as equalizing and shaping signals. That is, equalizing and shaping can be performed highly accurately even for a waveform containing nonlinear distortion, because it is first recognized which entered waveform signals containing distortion correspond to the signal values of the original waveform signal which was free from distortion, and equalizing signals are generated by the equalizing signal generator 3 in accordance with this recognition results.

$$s(x) = \frac{r(x)}{\Sigma r(x)} \qquad \text{(Eq. 2)}$$

$$O(t) = \Sigma(s(x) \cdot m(x)) \qquad \text{(Eq. 3)}$$

In the above embodiment, the waveform signal recognition means was composed by the learning type similarity arithmetic unit 2 using a neuro-computer, but the present invention shall not be limited to this and any other configuration can be used if signals at each point on the transition axis sampled by the serial signal sampling method can be identified.

Or in the above embodiment, the serial signal samlping means is designed to find the difference of input waveform signals at each point in time, but the present invention shall not be limited to. The input waveform signal value itself can be used as it is.

In the above embodiment, the teaching signal generator 4 is designed to generate reference teaching signals based on the output from the header sampler, but the present invention shall not be limited to this but may be designed to predetermine, for example, reference teaching signals and transmit them from the signal transmission side as well as to generate them independently.

In the above embodiment, the serial signal sampler 1, learning type similarity arithmetic unit 2, and other components are configured by special-purpose hardware, but in place of them, part or all of them may be, naturally, realized by software using computers.

Now, another embodiment of the present invention will be discussed in detail.

Figure 14A:
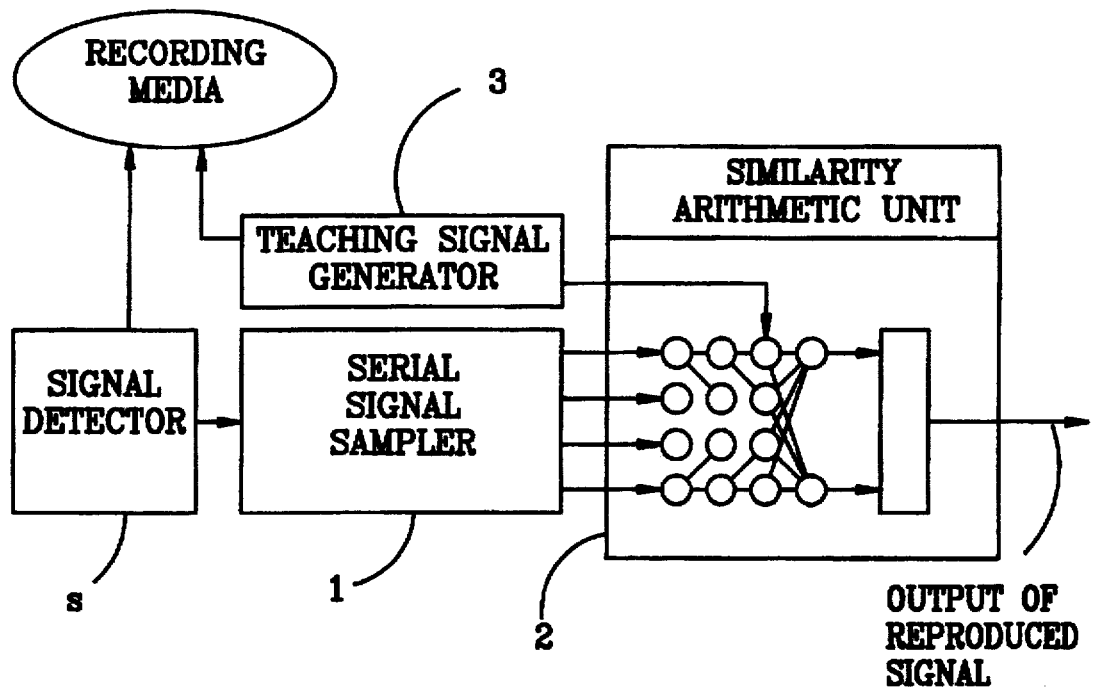
FIG. 14 (a) is a block diagram of learning type signal recording and reproducing apparatus of one embodiment according to the present invention.
Figure 14B:
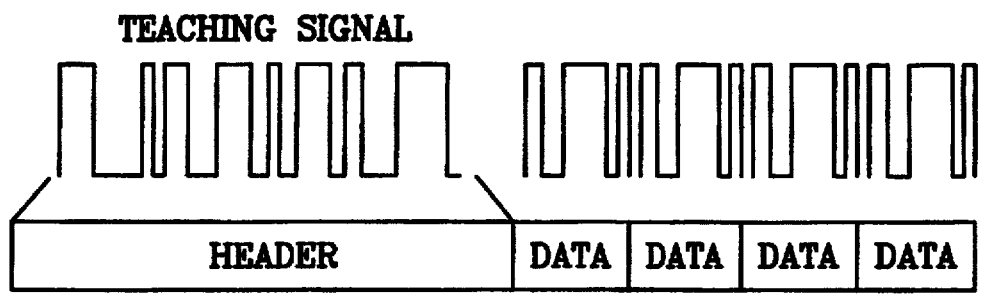

FIG. 14 (a) is a block diagram of the learning type signal recording and reproducing apparatus of the embodiment. In FIG. 14 (a), symbol s denotes the signal detector (signal detection means) for detecting signals recorded on the recording media, detects signals recorded on the recording media one by one and enters them into the serial signal sampler 1 as an analog waveform signal. The serial signal sampler 1 samples the signal change at each point on the transition axis of the waveform signal entered. Numeral 3 denotes the reference teaching signal generator as a reference signal generating means, which generates waveform signal patterns of reference teaching signals, that is, predetermined reference waveform signals. It is not particularly indicated in the drawing, but to the present signal recording and reproducing apparatus, a signal writer for recording signals outputted from the reference teaching signal generator 3 to the recording media is installed. However, reference teaching signals recorded to the recording media shall not be necessarily recorded with the signal recording and reproducing apparatus and may be recorded in advance at plants, etc. For example, there may be reference teaching signals recorded on the read-only mode recording media (CD-ROM, etc.). Numeral 2 is a learning type similarity arithmetic unit, which learns the relationship between the change of signals at each point on the transition axis sampled from reference teaching signals (see FIG. 14 (b)) of the header on the recording media by the serial signal sampler 1 and reference teaching signal generated by the reference teaching signal generator 3, automatically generate the conversion rule from recording signals on the recording media to the input signals which constitute the recording base, that is, the rule for threshold processing "0" or "1," and based on this judges signals detected from the recording media and outputs "0" or "1." The above-mentioned serial signal sampler 1 and learning type similarity arithmetic unit 2 compose the conversion rule generating means.

Next discussion will be made on the entire operation of the learning type signal recording and reproducing apparatus configured as above.

First of all, when signals are recorded, as shown in FIG. 14 (b), reference teaching signals formed by the predetermined waveform signal patterns generated by the reference teaching signal generator 3 are recorded on the signal header, and after that, actual data is recorded.

Next, when such signals recorded in this way are reproduced, reference teaching signals recorded on the signal header on the recording media is detected by the signal detector s. The serial signal sampler 1 samples the signal change at each point on the transition axis of the reference teaching signals of this header. The learning type similarity arithmetic unit 2 learns the relationship between the change of the signal at each point of the transition axis of the reference teaching signals of the header sampled by the serial signal sampler 1 and the reference teaching signals generated by the reference teaching signal generator 3 and automatically generates the conversion rule from the recording signals on the recording media to the input signals which serve as the basis of recording. Based on these learning results, the learning type similarity arithmetic unit judges and threshold-processes the data signals recorded after header and outputs either "0" or "1" reproducing signal, and is able to stably reproduce signals even when the signals have distortion due to noise or difference in the recording media.

The configuration of this serial signal sampler 1 is able to be applied with the circuit described, for example, in FIG. 2 mentioned above.

Figure 15:
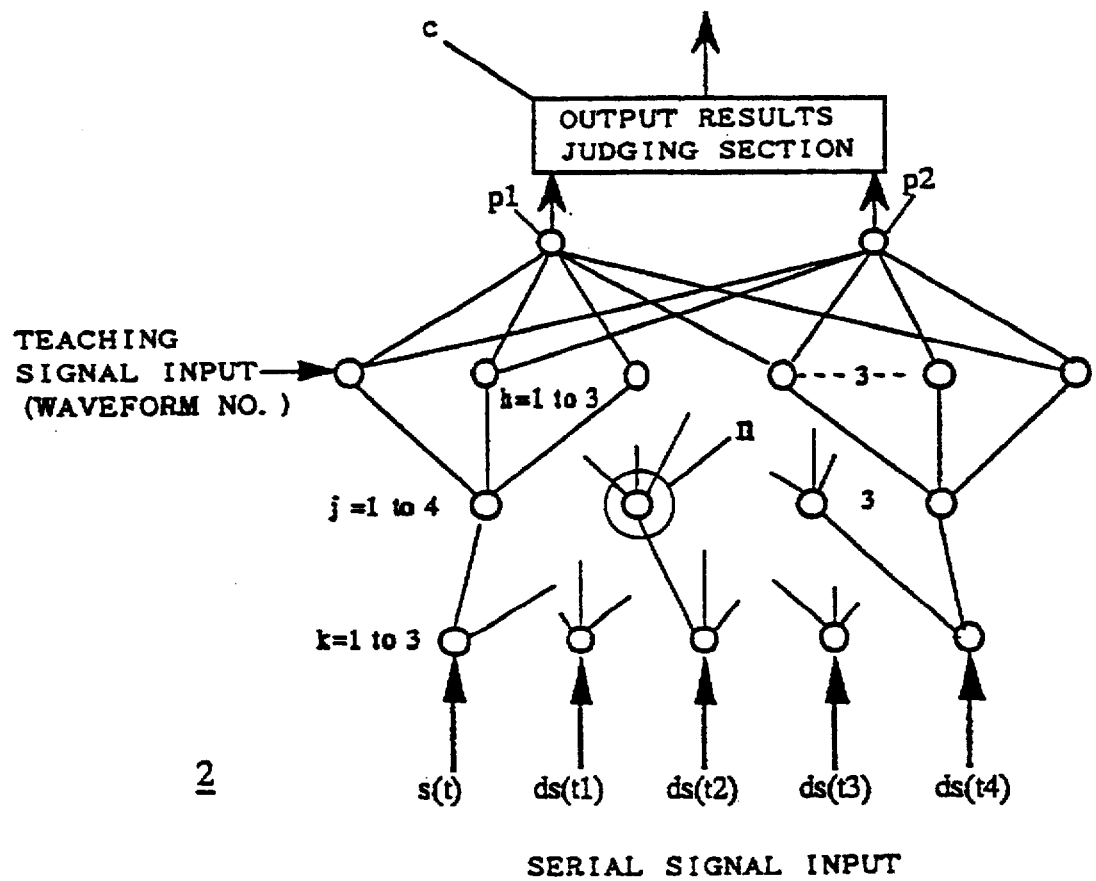
FIG. 15 is a configuration chart of the learning type similarity operating section of the learning type signal recording and reproducing apparatus of the the embodiment.
Figure 16:
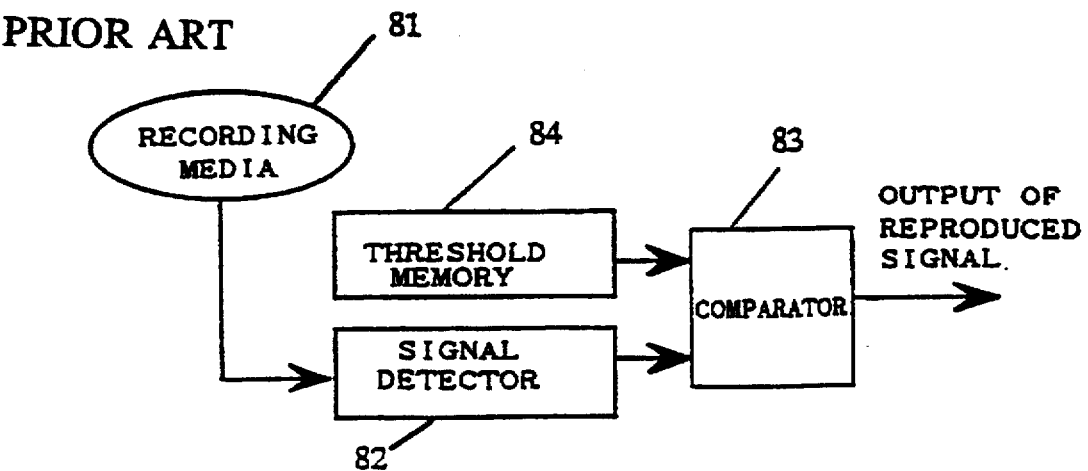
FIG. 16 is a block diagram of a conventional signal recording and reproducing apparatus.
Figure 17:
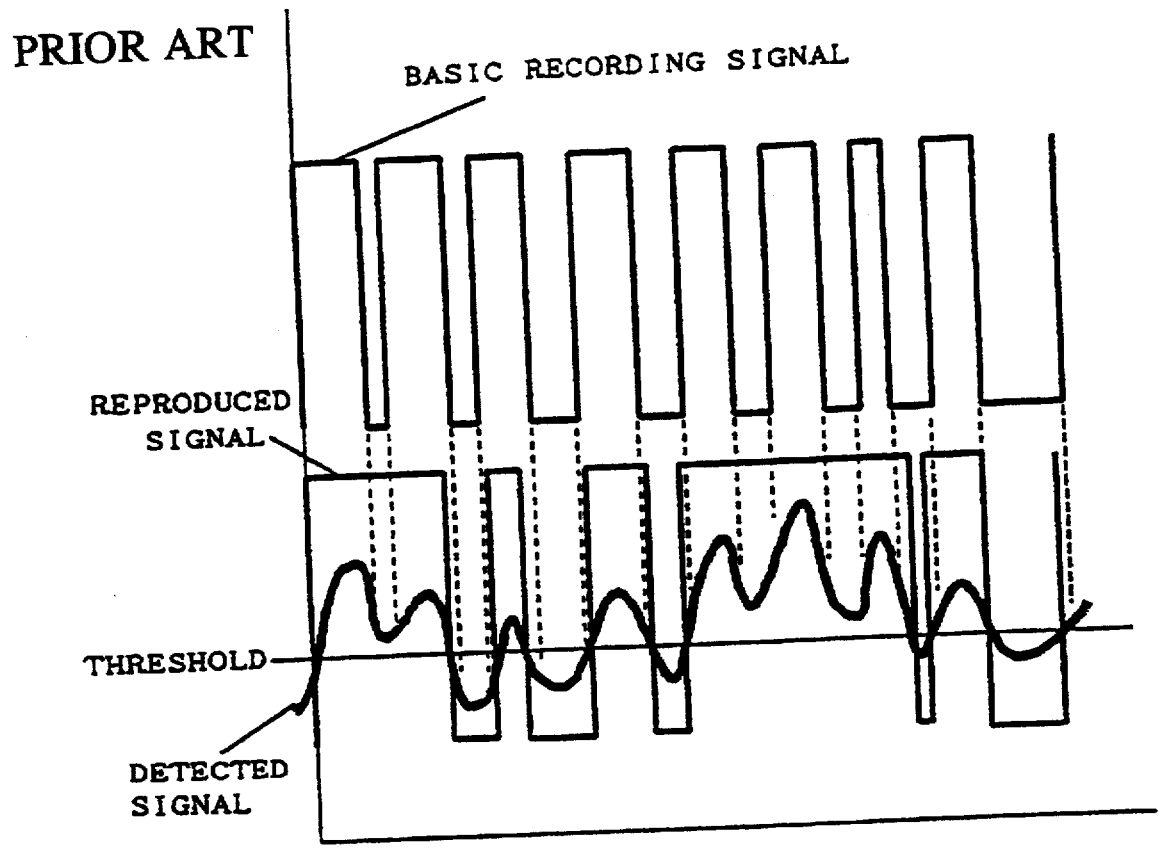
FIG. 17 shows how threshold-processing takes place for input waveform signals by the conventional signal recording and reproducing apparatus.

FIG. 15 is a configuration indicating one example of the above learning type similarity arithmetic unit 2. That is, the learning type similarity arithmetic unit 2 is designed to Judge input signal s(t) sampled by the serial signal sampler 1 as well as differential values ds(ta) to ds(tn) and to threshold-process waveform at time t, and is configured in the network form to have a four-layer hierarchy by combining a plurality of units recognition unit n. At the fourth layer, two unit recognition units p1, p2 corresponding to "0" and "1" are provided, enabling the output of the degree of agreement with "0" or "1". The fourth-layer unit recognition unit p1, p2 are interconnected with each output terminal on the third layer. Symbol c is the output result judging section, which compares the output values of unit recognition units p1, p2 and outputs "0" if p1>p2, and if not, "1" as a final result. The first layer is an input layer comprising five terminals, to which five serial signals comprising s(t), ds(t1) through ds(t4) are entered.

For the unit recognition unit using the second layer of the above-mentioned learning type similarity arithmetic unit 2, for example, the unit of FIG. 4 above can be applied.

For the above-mentioned path selector n3, for example, the path selector of FIG. 5 above can be applied.

For the unit recognition unit used for the third layer of the above-mentioned learning type similarity arithmetic unit 2, for example, the unit of FIG. 6 above can be applied.

Next, the learning operation of the learning type similarity arithmetic unit 2 shown in FIG. 15 is described.

First, 1 is given for the path signal to the path signal terminal n3a of the unit recognition unit n on the second layer. Entering five serial signals comprising s(t) and ds(t1) through ds(t4) sampled by the serial signal sampler 1 to the five terminals on the first layer enters these serial signals to the signal input terminal n1a of the second-layer unit recognition unit n (see FIGS. 2 and 6). The quantizer n2 of the second-layer unit recognition unit n quantizes this entered serial signal, sets loads n3w1 through n3w3 for connection to upper-layer unit recognition units, and transmits the path input signal to the third-layer unit recognition unit n. In this event, loads n3w1 through n3w16 of the third-layer unit recognition unit n weight path signals entered from the path input terminal n3a and output these weighted path signals to path output terminals n3b1 through n3b16 (see FIG. 6 and 8) The maximum output terminal detector n3c1 detects the path output terminal where the output is maximized and enters the number of the detected path output terminal to the comparator n3c2. And to the teaching input terminal n1t, the number of waveforms to learn, that is, the signal to which p1 or p2 the waveform corresponds is entered. The comparator n3c2 compares the number of the path output terminal detected by the maximum output terminal detector n3c1 with that of the path output terminal which the teaching input value indicates, and outputs 0 to the load increasing device when both terminal numbers do not agree and 1 when they agree. When the output to the comparator n3c2 is 0, that is, when the path output terminal which provides the maximum output differs from that indicated by the teaching input, the load increasing device n3c3 increases the strength of connections between the path input terminal n3a of the path input section and path output terminals n3b1 through n3b16 of the path output section indicated by the teaching input.

As described above, the learning process of the learning type similarity arithmetic unit 2 of the learning type signal recording and reproducing apparatus according to the present invention only requires that the serial signal sampled by the serial signal sampler 1 is entered to the signal input terminal n1a of the second-layer unit recognition unit n via the input terminal on the first layer, that the method of connection with the third-layer unit recognition unit n is set in accordance with the output of the quantizer n2 of each unit recognition unit n, and that in the third layer, the strength of connections between the path input terminal n3a of the unit recognition unit n and path output terminals n3b1 through n3b16 indicated by the teaching input value is varied by the path learning device n3c, thereby achieving extremely high-speed learning.

Now discussion will be made on the waveform conversion operation of the learning type similarity arithmetic unit 2 shown in FIG. 15.

In the completely same manner as the learning operation described above, first, 1 is given for the path signal to the path signal terminal n3a of the unit recognition unit n on the second layer. Entering five serial signals comprising s(t) and ds(t1) through ds(t4) sampled by the serial signal sampler 1 to the five terminals on the first layer enters these serial signals to the signal input terminal n1a of the second-layer unit recognition uni n. The quantizer n2 of the second-layer unit recognition unit n quantizes this entered serial signal, sets loads n3w1 through n3w3 for connection to upper-layer unit recognition units, and transmits the path input signal to the third-layer unit recognition unit n. In the waveform recognition operation, to the reference teaching signal input terminal n1t of the third-layer unit recognition unit n, the teaching input signal is not entered. Consequently, loads n3w1 through n3w16 of the third-layer unit recognition unit n hold the load state at the time of learning and weight path signals entered from the path input terminal n3a; and output these weighted path signals to path output terminals n3b1 through n3b16 and the path signals are transmitted to the path input terminal n3a of the fourth-layer total unit recognition unit p. The adder n3as of the path input section of the fourth-layer unit recognition unit p adds all path signals entered and transmits the results to the threshold processor n3bs. The threshold processor n3bs threshold-processes and outputs the signal to the output terminal n3b. Consequently, if the value of the added signal is greater than a certain threshold value, output takes place, and each unit recognition unit p1 and p2 outputs the degree of agreement of the entered serial signal with "0" or "1" and the output result judging section c compares the output values of p1 and p2 and outputs "0" if p1>p2, and if not, "1" as a final result.

As described above, the waveform conversion process of the learning type similarity arithmetic unit 2 of the learning type signal recording and reproducing apparatus according to the present invention can threshold-process the entered serial signals at remarkably high speed and very accurately based on the learning results only by entering the serial signals sampled by the serial signal sampler 1 to the signal input terminal n1a of each unit recognition unit n on the second layer, setting the method of connection with the unit recognition unit on the third layer in accord with the output of the quantizer n2 of each unit recognition unit 2. In the third layer, weighting the path signal entered from the path input terminal n3a in accord with the loads set at the learning process, as well as outputting the weighted path signals to path output terminals n3b1 through n3b16 and transmitting the path signals to the path input terminal n3a of the total unit recognition unit on the fourth layer.

As described above, when signals are recorded, reference teaching signals comprising waveform signal patterns generated by the reference teaching signal generator 4 are recorded in the signal header and after that actual data is recorded. On the other hand, when signals are reproduced, reference teaching signals recorded in the signal header on the recording media are detected by the signal detector s, and the relationship between the detection results and the reference teaching signals outputted from the reference teaching signal generator 4 is learned to automatically generate the conversion rule from the recorded signal on the recording media to the input signal which serves as a basis of recording. Then, based on this learning result, converting the recorded signal recorded after the header enables the stable reproduction of signals even the signals have distortion caused by noise or difference in the recording media, etc.

In the above embodiment, the conversion rule generating means was a neuro-computer, but the present invention shall not be limited to this but any other configuration can be used if the conversion rule to correctly reproduce recording signals can be generated. The neuro-computer of the other system may be used.

Or in the above embodiment, for the serial signal, five signals were used, but needless to say, the number of the signals shall not be limited to this.

Nor should the number of terminals of the path input terminal and that of the path output terminal of the unit recognition unit be limited to the number of terminals of the above embodiment.

In the above embodiment, the conversion rule generating means were configured by special-purpose hardware, but in place of them, the similar function may be, naturally, realized by software using computers As clear from what has been described above, the present invention provides an advantage that even input waveform signals containing strong distortion of nonlinearity can be successfully equalized and shaped, and equalizing errors can be reduced to a minimum.

The present invention also provides the advantage that threshold-processing can correctly be carried out and stable reproduction of signals is achieved.

What is claimed is:

1. A learning type signal recording and reproducing apparatus comprising:

a reference signal generating means for generating predetermined reference waveform signals and applying them to a recording media for recordation thereby, a signal detection means for detecting recorded signals from the recording media, the recorded signals corresponding to the reference waveform signals recorded by the media, and a conversion rule generating means receiving detected recorded signals from the signal detection means and the corresponding reference waveform signals from the reference signal generating means, and generating conversion rules based on a relationship between the detected recorded signals and the reference waveform signals to correctly reproduce signals recorded on the recording media.

2. A learning type signal recording and reproducing apparatus according to claim 1, wherein the conversion rule generating means includes:

a serial signal sampler for sampling as serial signals, signal changes at each point on a transition axis of the detected recorded signals, and a learning type similarity calculation unit for automatically generating a conversion rule by learning a relationship between the signal changes at each point on the transition axis sampled by the serial signal sampler and the reference waveform signals generated by the reference signal generating means.

3. A learning type signal recording and reproducing apparatus according to claim 2, wherein the learning type similarity calculation unit includes a plurality of recognition units, the plurality of recognition units each including a signal input section for the serial signals, and a path selector which has at least one path input terminal and at least one path output terminal and which selects a path in accordance with the entered serial signals; and whereby the plurality of recognition units are formed in a network to have a multi-layer hierarchy.

4. A learning type signal recording and reproducing apparatus according to claim 3, wherein a recognition unit of a preceding layer of an output layer of the network receives reference waveform signals in place of the serial signals to the signal input section and includes:

a path learning device which varies connection strengths between the at least one path input terminal and the at least one path output terminal according to the conversion rule, and an output results judging device for detecting a maximum output recognition unit of the output layer of the network.

5. A learning type signal recording and reproducing apparatus according to claim 2, wherein the serial signal sampler includes:

a present signal sampler for sampling output signals at a specified point on the transition axis of the detected recorded signals, and a change rate sampling section for calculating a difference between the signals sampled by the present signal sampler and output signals before said specified point.

6. A learning type signal recording and reproducing apparatus according to claim 5, wherein the change rate sampling section includes:

a memory for storing present signals at each point on the transition axis of the detected recorded signals sampled by the signal sampler, one by one in a specified range, and a differential calculation unit for calculating a difference between the signal sampled by the present signal sampler and the signal stored in the memory.

7. A waveform signal equalizing apparatus comprising:

serial signal sampling means for sampling signals at each point on a transition axis of a waveform signal which is outputted from a specified signal system, waveform signal recognition means for obtaining an output result representing a change to a signal caused by the specified signal system and sampled by the serial signal sampling means using pattern recognition, and equalizing signal generating means for generating equalizing signals based on the output result of the waveform signal recognition means, wherein the waveform signal recognition means contains waveform signal values as a plurality of recognition categories corresponding to a predetermined reference teaching signal, the plurality of recognition categories represent the predetermined reference teaching signal in a condition unmodified by the specified signal system, and the waveform signal recognition means has a learning type similarity calculation means which learns a learnable relationship between serial signals sampled by the serial signal sampling means and the plurality of recognition categories, whereby when the predetermined reference teaching signal is inputted to the specified signal system, the learning type calculation means learns the learnable relationship, and when unknown signals are inputted to the specified signal system, the waveform signal recognition means, based on the learnable relationship learned by the similarity calculation means, outputs the output result for the serial signals sampled at each point on the transition axis.

8. A waveform signal equalizing apparatus according to claim 7, wherein the learning type similarity calculation means has a signal input section for inputting serial signals, and a path selector which has at least one path input terminal and at least one path output terminal and selects a path in accordance with inputted serial signals;

recognition units are formed in a network to have a multi-layer hierarchy;

a recognition unit of a preceding layer of an output layer of the network receives the reference teaching signals; and a path learning device which varies connection strengths between the at least one path input terminal and the at least one path output terminal according to the learned relationship.

9. A waveform signal equalizing apparatus according to claim 7, wherein the equalizing signal generating means includes a similarity inner divider for calculating an inner division similarity ratio to the recognition categories that are provided by the waveform signal recognition means, and a signal value synthesizer for calculating a product of the sum of the inner division ratio and signal values corresponding to each recognition category.

10. A waveform signal equalizing apparatus according to claim 7, wherein the equalizing signal generating means detects a maximum similarity value for recognition categories provided by the waveform signal recognition means.

11. A waveform signal equalizing apparatus according to claim 7, further comprising a reference teaching signal generator for generating reference teaching signals including a multiplicity of signal values as recognition categories, and a header sampler for sampling a header of input waveform signals, wherein the learning type similarity calculation unit learns a relationship between the serial sampled signals at each point on the transaction axis of signals in the header sampled by the header sampler and the reference teaching signals generated by the reference teaching signal generator.

12. A waveform signal equalizing apparatus according to claim 11, wherein the header sampler comprises a waveform input detector for detecting a head of a waveform signal and a gate pulse generator for generating gate pulses for a specified time after the waveform input detector detects the head of a waveform signal.

13. A waveform signal equalizing apparatus according to claim 11, wherein the header sampler includes a header specifying signal detector for detecting a header specifying signal from outside, and a specified range sampler for sampling a specified range of a waveform signal in accordance with an output of the header specifying signal detector.

14. A waveform signal equalizing apparatus according to claim 13, wherein the specified range sampler includes a header specifying pulse generator for generating gate pulses during a specified range of the header signal in accordance with an output of the header specifying signal detector.

15. A waveform generation method comprising the steps of:

applying a teaching signal to a system;

obtaining a waveform signal from said system;

sampling said waveform signal at each point on a transition axis to obtain serial signals;

applying said teaching signal and said serial signals to a pattern recognition means in order to obtain a relationship between said teaching signal and said serial signals; and determining original signals applied to said system based upon waveform signals obtained from said system and said relationship between said teaching signal and said serial signals.

16. A waveform generation method according to claim 15, wherein said serial signals include a last applied sampled signal and differences between sampled signals including current and past sampled signals.

* * * * *